(12) United States Patent
Guo

(10) Patent No.: US 8,912,962 B2
(45) Date of Patent: Dec. 16, 2014

(54) DATA CARD WITH UNIVERSAL SERIAL BUS PLUG

(75) Inventor: Zhipeng Guo, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 416 days.

(21) Appl. No.: 13/431,249

(22) Filed: Mar. 27, 2012

(65) Prior Publication Data

US 2012/0182201 A1    Jul. 19, 2012

Related U.S. Application Data

(63) Continuation of application No. PCT/CN2010/077338, filed on Sep. 27, 2010.

(30) Foreign Application Priority Data

Sep. 27, 2009 (CN) .......................... 2009 1 0190741

(51) Int. Cl.
```
H01Q 1/24      (2006.01)
H01R 13/447    (2006.01)
G06K 19/07     (2006.01)
G06K 19/077    (2006.01)
H01Q 1/22      (2006.01)
H01Q 1/42      (2006.01)
H01Q 1/44      (2006.01)
```
(52) U.S. Cl.
CPC ............. H01R 13/447 (2013.01); G06K 19/07 (2013.01); G06K 19/07732 (2013.01); G06K 19/07733 (2013.01); H01Q 1/2275 (2013.01); H01Q 1/42 (2013.01); H01Q 1/44 (2013.01); H01R 2201/02 (2013.01)
USPC .......................................... 343/702; 343/906

(58) Field of Classification Search
CPC ................. G06K 19/07732; G06K 19/07733; H01Q 1/42; H01Q 1/44; H01Q 1/2275; H01R 2201/02
USPC ................................................... 343/702, 906
See application file for complete search history.

(56) References Cited

U.S. PATENT DOCUMENTS 6,758,689 B1 *  7/2004  Bair et al. ...................... 439/136
7,586,460 B2 *  9/2009  Hunt et al. ..................... 343/882
(Continued)

FOREIGN PATENT DOCUMENTS

CN         2777773 Y      5/2006
CN       201094154 Y      7/2008
(Continued)

OTHER PUBLICATIONS

The State Intellectual Property Office of the People'S Republic of China, English Translation of the International Search Report (Jan. 6, 2011).

(Continued)

*Primary Examiner* — Hoanganh Le
(74) *Attorney, Agent, or Firm* — Leydig, Voit & Mayer, Ltd.

(57) ABSTRACT

A data card with a USB plug (207) includes a housing (201) and a cap (203). A data card antenna (205) is disposed in the cap. The cap further has at least one cap wing (209) extending from an opening of the cap. A cap antenna contact (211) is provided on the cap wing. The cap antenna contact is electrically connected with the antenna in the cap. A housing antenna contact (213) is provided on an end portion of the housing. The housing antenna contact is electrically connected with a circuit in the housing. When the cap is relatively fixed to a bottom end of the housing, the cap antenna contact is electrically connected with the housing antenna contact. The disposition of the antenna in the cap reduces a body size of the data card, and therefore reduces a size of the entire data card.

12 Claims, 3 Drawing Sheets

(56) References Cited

U.S. PATENT DOCUMENTS

| | | | |
|---|---|---|---|
| 8,274,447 B2* | 9/2012 | Zhang et al. | 343/906 |
| 2009/0066587 A1* | 3/2009 | Hayes et al. | 343/702 |
| 2011/0188211 A1 | 8/2011 | Zhao | |

FOREIGN PATENT DOCUMENTS

| | | |
|---|---|---|
| CN | 201114118 Y | 9/2008 |
| CN | 201188322 Y | 1/2009 |
| CN | 201188450 Y | 1/2009 |
| CN | 201197148 Y | 2/2009 |
| CN | 201204050 Y | 3/2009 |
| CN | 201260157 Y | 6/2009 |
| JP | 2006-067254 A | 3/2006 |
| JP | 2006067254 A | 3/2006 |
| WO | WO 2006/022353 A1 | 3/2006 |
| WO | WO 2011/035731 A1 | 3/2011 |

OTHER PUBLICATIONS

The State Intellectual Property Office of the People'S Republic of China, Written Opinion of the International Searching Authority (Jan. 6, 2011).

State Intellectual Property Office of the People's Republic of China, International Search Report in International Application No. PCT/CN2010/077338 (Jan. 6, 2011).

Extend European Search Report in corresponding European Patent Application No. 10818425.0 (Jul. 2, 2012).

$1^{st}$ Office Action in corresponding Chinese Patent Application No. 200910190741.X (Jan. 23, 2013).

* cited by examiner

DATA CARD WITH UNIVERSAL SERIAL BUS PLUG

CROSS-REFERENCE TO RELATED APPLICATIONS

This application is a continuation of International Application No. PCT/CN2010/077338, filed on Sep. 27, 2010, which claims priority to Chinese Patent Application No. 200910190741.X, filed on Sep. 27, 2009, both of which are hereby incorporated by reference in their entireties.

FIELD OF THE INVENTION

The present invention relates to the field of communications, and in particular, to a data card with a universal series bus USB plug.

BACKGROUND OF THE INVENTION

A USB data card, used widely in the industry currently, is shown in FIG. 1. A housing 101 and a cap 103 have a split design. The housing 101 is an outer casing a body of the data card. A circuit (not shown) and an antenna 105 are deployed in the housing. The cap 103 is a front outer protecting a USB interface 107. Nothing is disposed in the cap 103. In the USB data card shown in FIG. 1, the antenna 105 is disposed in the housing 101 and is located at an end away from the USB interface 107, so as to reduce the influence of a USB signal on the antenna.

The inventor finds that in the prior art, the antenna disposed in the USB data card occupies a large space, so that a size of the entire data card is too large.

SUMMARY OF THE INVENTION

Embodiments of the present invention provide a USB data card, so as to reduce a size of the entire data card.

The data card includes a housing and a cap, where
 a data card antenna is disposed in the cap; the cap further has at least one cap wing extending from an opening, a cap antenna contact is provided on the cap wing, the cap antenna contact is electrically connected with the antenna in the cap; a housing antenna contact is provided on an end portion of the housing, the housing antenna contact is electrically connected with a circuit in the housing; and when the cap is relatively fixed to a bottom end of the housing, the cap antenna contact is electrically connected with the housing antenna contact.

According to the USB data card disclosed in the embodiments of the present invention, the antenna is disposed in the cap, so as to reduce a body size of the data card, and therefore reduce the size of the entire data card.

BRIEF DESCRIPTION OF THE DRAWINGS

The accompanying drawings described herein are provided for further understanding of the present invention, which are a part of the application, but are not intended to limit the present invention. In the accompanying drawings.

DETAILED DESCRIPTION OF THE EMBODIMENTS

In order to make the objectives, technical solutions, and advantages of the present invention clearer, the present invention is further described in detail in the following with reference to embodiments and accompanying drawings. Herein, the exemplary embodiments of the present invention and descriptions thereof are merely provided for explaining the present invention, instead of limiting the present invention.

An embodiment of the present invention provides a USB data card.

Figure 1:
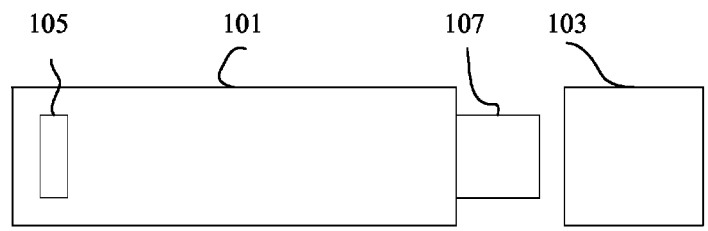
FIG. 1 is a schematic structural diagram of a USB data card in the prior art.
Figure 2A:
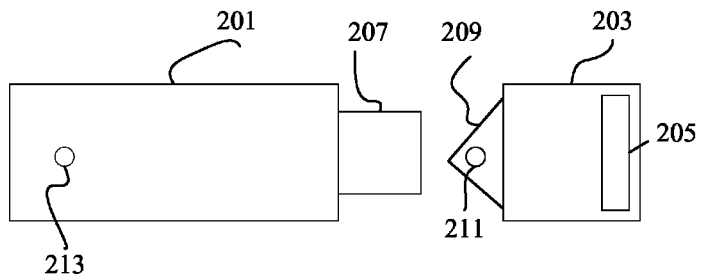
FIG. 2A is a schematic structural diagram of a USB data card disclosed in an embodiment of the present invention.

As shown in FIG. 2A, the data card includes a housing 201 and a cap 203 that are disposed separately. The housing 201 is an outer casing a body of the data card. A circuit (not shown) is deployed in the housing. The cap 203 is a front outer protecting a USB interface 207. An antenna 205 is disposed in the cap 203. The cap 203 further has at least one cap wing 209 extending from an opening. An antenna contact is provided on the cap wing 209 and is referred to as a cap antenna contact 211 herein. The cap antenna contact 211 can be electrically connected with the antenna 205 in the cap 203. Another antenna contact is provided in an end portion of the housing 201 and is referred to as a housing antenna contact 213 herein. The housing antenna contact 213 can be electrically connected with the circuit in the housing 201.

Figure 2B:
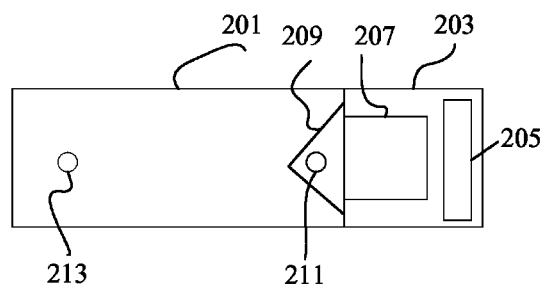
FIG. 2B is a schematic diagram of an overall state of the USB data card disclosed in the embodiment of the present invention.

When being deployed in the cap 203, the antenna 205 should be deployed as close to an end portion of the cap 203 as possible, so that an opening of the cap 203 has enough space for accommodating the USB interface 207, so as to protect the USB interface 207. FIG. 2B is a schematic diagram of the entire USB data card. In this state, the USB interface 207 is accommodated in the cap 203, and the USB data card is in a nonuse state. The cap wing 209 is located on a side of the housing 201. Optionally, two cap wings 209 may exist and be disposed opposite on two sides of the opening of the cap 203. In this case, the two cap wings 209 may clamp two sides of the housing 201. The cap antenna contact 211 may be disposed on one or both of the two cap wings 207. The cap antenna contact 211 may be a cone, a hemisphere, or a domed column, which is not limited in the embodiment of the present invention. A material of the cap antenna contact 211 may be a material with a good electrical conductivity, such as copper or silver, or may further be a material with a good electromagnetic property and oxidation resistance and suitable for fabricating an exposed electrical contact, which is not limited in the embodiment of the present invention.

Figure 2C:
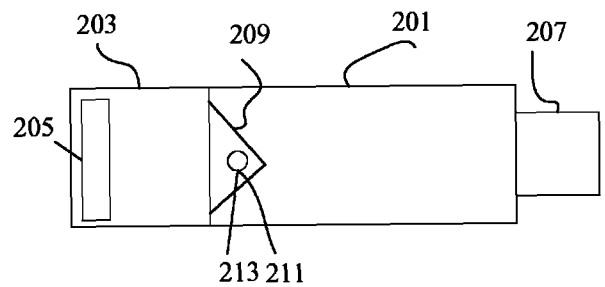
FIG. 2C is a schematic diagram of a use state of the USB data card disclosed in the embodiment of the present invention.

Reference may be further made to FIG. 2C. FIG. 2C is a schematic diagram of a use state of the USB data card. In this state, the cap 203 may be relatively fixed to a bottom end of the housing 201. The relative fixing may be achieved by clamping the two cap wings 209 disposed opposite, or by designing the cap 203 and the bottom end of the housing 201 to have a mortise and tenon structure, which is not limited in the embodiment of the present invention. When the cap 203 is relatively fixed to the bottom end of the housing 201, the cap antenna contact 211 can be electrically connected with the housing antenna contact 213. In this way, through a bridge connection between the cap antenna contact 211 and the housing antenna contact 213, the antenna 205 can be electrically connected with the circuit disposed in the housing 201. Moreover, the antenna 205 is still located at a far end of the USB interface 207, so as to prevent the interference of a USB signal on the antenna.

In the USB data card disclosed in the embodiment of the present invention, the antenna 205 is disposed in the cap 203, and the antenna 205 is electrically connected with the circuit of the data card through the cap antenna contact 211 and the housing antenna contact 213, so as to reduce a body size of the data card and reduce a size of the entire data card.

Figure 3:
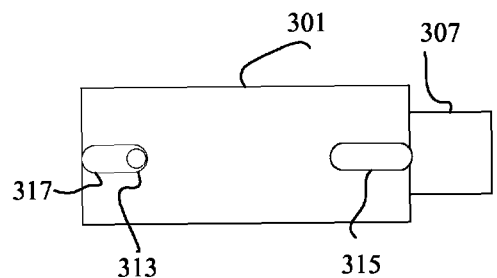
FIG. 3 is a schematic structural diagram of another housing of a USB data card disclosed in an embodiment of the present invention.

In the USB data card described in the foregoing embodiment, the cap antenna contact 211 always contacts the housing 201 and is scraped against the housing with the pulling and plugging of the cap 203, so that wear is easily caused. For that reason, an embodiment of the present invention provides a housing of an improved separate-type USB data card. As shown in FIG. 3, a housing 301, a USB interface 307, and a housing antenna contact 313 are all the same as the corresponding parts shown in FIG. 2. In the embodiment of the present invention, two guide grooves, that is, an interface end guide groove 315 and a bottom end guide groove 317, are further disposed on the housing 301. The two guide grooves should have a suitable depth and width so that a cap antenna contact can freely slide along the groove in the guide groove. An end of the interface end guide groove 315 towards the USB interface is open, and an end towards the housing 301 is closed. The interface end guide groove 315 should have a suitable length so that the cap antenna contact is still located in the groove when the cap is placed in a manner shown in FIG. 2B. An end of the bottom end guide groove 317 towards a bottom end of the housing 301 is open, and an end towards the USB interface is closed after traveling across the housing antenna contact 313. In this way, during pulling and plugging, the cap antenna contact can be accommodated in the guide grooves and freely slide without friction against the housing, so as to prevent excessive wear.

In the embodiments shown in FIG. 2 and FIG. 3, the housing and the cap of the USB data card are separate from each other, so the cap is easily lost. Once the cap is lost, the antenna is lost, causing that the USB data card cannot be used. In order to solve the problem, an embodiment of the present invention further discloses a USB data card, as shown in FIG. 4.

Figure 4A:
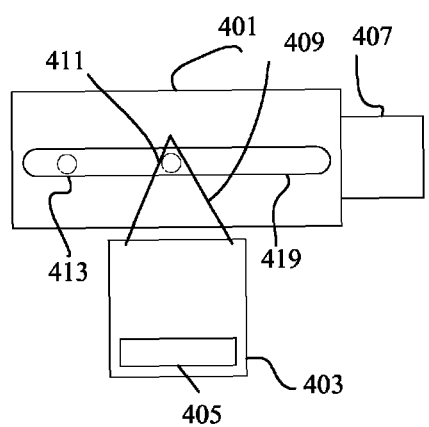
FIG. 4A and FIG. 4B are schematic structural diagrams of another USB data card disclosed in an embodiment of the present invention.
Figure 4B:
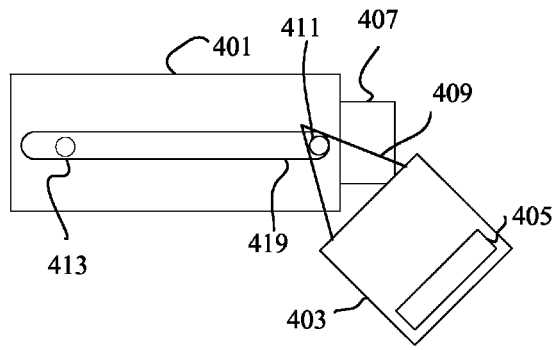

In FIG. 4, a USB interface 407, a cap 403, an antenna 405, a cap antenna contact 411, and a housing antenna contact 413 are all the same as the corresponding parts in the foregoing embodiments. In FIG. 4, the interface end guide groove 315 and the bottom end guide groove 317 are replaced by a housing guide groove 419. The housing guide groove 419 extends along a long axis of a housing 401. The two ends of the housing guide groove 419 are closed. The housing antenna contact 413 is located at one end of the housing guide groove near a bottom end of the USB data card. The housing guide groove 419 should have a suitable depth and width so that the cap antenna contact 411 can freely slide along the groove in the housing guide groove 419. The USB data card should be disposed with at least tow cap wings 409 disposed opposite. The cap antenna contact 411 can slide along the housing guide groove 419, but cannot depart from the housing guide groove 419. Optionally, another side of the housing 401 opposite to the side disposed with the housing guide groove 419 may also have a corresponding guide groove. In this case, the cap wing opposite to the cap wing 409 may have a bump similar to the cap antenna contact 411, where the bump can slide in the groove, but cannot depart from the guide groove. Like the cap antenna contact 411, the bump may also have an electrical connection property, or may not have the electrical connection property. A length of the housing guide groove 419 should fit a length of the cap wing 409, so that when the cap antenna contact 411 slides to an end of the housing guide groove 419, that is, a bottom end of the housing guide groove 419 at most, the cap 403 can rotate at an angle with the cap antenna contact 411 as an axis, as shown in FIG. 4B, so there is enough space for docking with the housing 401, and the state shown in FIG. 2B or 2C is realized.

In the USB data card disclosed in the embodiment of the present invention, the cap 403 and the housing 401 can be fixed relatively through the cap antenna contact 411 and the housing guide groove 419, so as to solve the problem that the cap 403 is easily lost caused by the fact that the cap 403 and the housing 401 are split.

The housing antenna contact of the USB data card in each of the foregoing embodiments is exposed for a long time when not in use, so the electrical connection property of the housing antenna contact is easily affected due to oxidization. For this reason, an embodiment of the present invention further improves the USB data card to solve the problem. On the basis of the embodiments shown in FIG. 2 and FIG. 3, in an embodiment of the present invention, a one-way elastic valve is mounted outside the housing antenna contact. The one-way elastic valve can only be opened from the bottom end of the housing towards the USB interface end. When moving from the bottom end of the housing towards the USB interface end of the housing, the cap antenna contact opens the one-way elastic valve to expose the housing antenna contact, so as to realize the electrical connection of the cap antenna contact and the housing antenna contact. When the cap antenna contact moves from the USB interface end of the housing towards the bottom end of the housing after the USB data card is used, the one-way elastic valve is automatically closed due to an elastic force of the one-way elastic valve, so as to cover the housing antenna contact. The one-way elastic valve may be a common one-way valve, for example, a valve similar to a protection valve of a network port or a telephone port. In this way, when the USB data card is not in use, the exposure of the housing antenna contact is prevented, so that the degree of damage due to oxidation can be effectively controlled.

If the USB data card structure shown in FIG. 4 is used, and a one-way elastic valve is also mounted outside the housing antenna contact 413, the sliding of the cap antenna contact 411 in the housing guide groove 409 may be hindered. In view of this, an embodiment of the present invention further improves the embodiment shown in FIG. 4 to form an embodiment shown in FIG. 5.

Figure 5A:
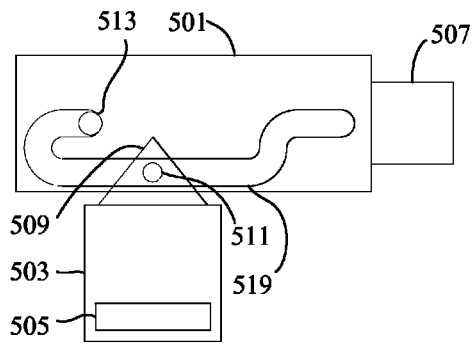
FIG. 5A and FIG. 5B are schematic structural diagrams of another USB data card disclosed in an embodiment of the present invention.
Figure 5B:
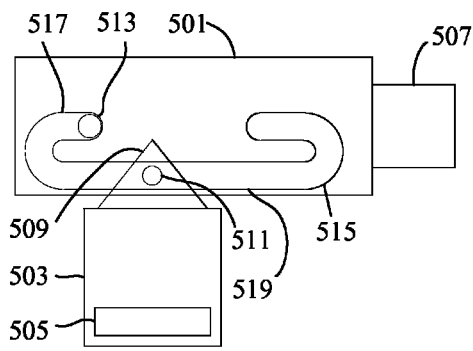

In embodiment shown in FIG. 5, a USB interface 507, a cap 503, a cap wing 509, an antenna 505, a cap antenna contact 511, and a housing antenna contact 513 are all the same as the corresponding parts in the embodiment shown in FIG. 4. A housing guide groove 519 is disposed differently. As shown in FIG. 5A or FIG. 5B, the housing guide groove may be divided into three parts. Referring to FIG. 3, it can be found that the housing guide groove in FIG. 5A or FIG. 5B is the housing guide groove 519 in FIG. 5A or FIG. 5B formed by closing the two ends of the interface end guide groove 315 and the bottom end guide groove 317 shown in FIG. 3, and connecting the end of the bottom end guide groove 317 near the bottom end with either end of the interface end guide groove 315 by using a segment of a communication guide groove biasing against the interface end guide groove 315 and the bottom end guide groove 317. The communication guide groove may be an arc-shaped guide groove or a multi-curve guide groove, which is not limited in the embodiment of the present invention. FIG. 5A and FIG. 5B are provided as an example only. However, a shape of the communication guide groove should ensure that the cap antenna contact 511 can freely slide in the housing guide groove 519. Through the solution in the embodiment of the present invention, when moving from the interface end towards the bottom end, the cap antenna contact 511 does not travel across the housing antenna contact 513. In this way, a one-way elastic valve can be mounted on the housing antenna contact 513.

The objectives, technical solutions, and beneficial effects of the present invention have been described in further detail through the foregoing specific embodiments. It should be understood that the foregoing descriptions are merely specific embodiments of the present invention, but not intended to limit the protection scope of the present invention. Any modifications, equivalent replacements, or improvements made without departing from the spirit and principle of the present invention should fall within the protection scope of the present invention.

What is claimed is:

1. A data card with a Universal Serial Bus (USB) plug, comprising:
    a housing including a housing antenna contact that is provided on an end portion of the housing, wherein the housing antenna contact is electrically connected with a circuit in the housing; and
    a cap, wherein a data card antenna is disposed in the cap, the cap further has at least one cap wing extending from an opening, a cap antenna contact is provided on the at least one cap wing, and the cap antenna contact is electrically connected with the data card antenna in the cap; wherein the cap is relatively fixed to a bottom end of the housing, and the cap antenna contact is electrically connected with the housing antenna contact;
    wherein an interface end guide groove is disposed near a USB interface end on the housing, and a bottom end guide groove is disposed near the bottom end of the housing; an end of the interface end guide groove towards the USB interface is open, and an opposite end of the interface end guide groove is closed; an end of the bottom end guide groove towards the bottom end is open, and an opposite end of the bottom end guide groove is closed after traveling across the housing antenna contact; and the cap antenna contact is configured to freely slide along the groove in the interface end guide groove and the bottom end guide groove.

2. The data card according to claim 1, wherein an opening end of the cap has enough space for accommodating a USB interface of the data card.

3. The data card according to claim 1, wherein the cap antenna contact is a cone, a hemisphere, a column, or a domed column.

4. A data card with a Universal Serial Bus (USB) plug, comprising:
    a housing including a housing antenna contact that is provided on an end portion of the housing, wherein the housing antenna contact is electrically connected with a circuit in the housing; and
    a cap, wherein a data card antenna is disposed in the cap, the cap further has at least one cap wing extending from an opening, a cap antenna contact is provided on the at least one cap wing, and the cap antenna contact is electrically connected with the data card antenna in the cap, wherein the cap is relatively fixed to a bottom end of the housing, and the cap antenna contact is electrically connected with the housing antenna contact;
    wherein a housing guide groove is further disposed on the housing, the housing guide groove extends along a long axis of the housing, two ends of the housing guide groove are closed, the housing antenna contact is located at one end of the housing guide groove near the bottom end; and
    wherein the cap is disposed with two cap wings opposite to each other, the cap antenna contact is disposed on one of the cap wings, the cap antenna contact is configured to slide along the housing guide groove, but is not configured to depart from the housing guide groove.

5. The data card according to claim 4, wherein:
    a same second guide groove is also disposed on a side opposite to a side of the housing disposed with the guide groove;
    a second cap antenna contact or a bump with a shape similar to that of the cap antenna contact is disposed on the cap wing opposite to the cap wing disposed with the cap antenna contact; and
    the second cap antenna contact or the bump with a shape similar to that of the cap antenna contact is configured to slide along the second guide groove, but is not configured to depart from the second guide groove.

6. The data card according to claim 4, wherein when the cap antenna contact slides to an end of the housing guide groove, the cap is configured to rotate with the cap antenna contact as an axis, so as to dock with the housing.

7. The data card according to claim 4, wherein the opening of the cap has enough space for accommodating a USB interface of the data card.

8. The data card according to claim 4, wherein the cap antenna contact is a cone, a hemisphere, a column, or a domed column.

9. A data card with a Universal Serial Bus (USB) plug, comprising:
    a housing including a housing antenna contact that is provided on an end portion of the housing, wherein the housing antenna contact is electrically connected with a circuit in the housing; and
    a cap, wherein a data card antenna is disposed in the cap, the cap further has at least one cap wing extending from an opening, a cap antenna contact is provided on the at least one cap wing, and the cap antenna contact is electrically connected with the data card antenna in the cap, wherein the cap is relatively fixed to a bottom end of the housing, and the cap antenna contact is electrically connected with the housing antenna contact;
    wherein an interface end guide groove is disposed near a USB interface end on the housing, and a bottom end guide groove is disposed near the bottom end; either end of the interface end guide groove is connected with another communication guide groove biasing against the interface end guide groove and the bottom end guide groove, and an opposite end of the interface end guide groove is closed; an end of the bottom end guide groove away from the housing antenna contact is connected with the communication guide groove, and an opposite end of the bottom end guide groove is closed after traveling across the housing antenna contact; and the cap antenna contact is configured to freely slide along the groove in the interface end guide groove, the communication guide groove, and the bottom end guide groove, but the cap antenna contact is not configured to depart from any of the communication guide groove, or the bottom end guide groove.

10. The data card according to claim 9, wherein the communication guide groove is of an arc shape or a multi-curve shape.

11. The data card according to claim 9, wherein the opening of the cap has enough space for accommodating a USB interface of the data card.

12. The data card according to claim 9, wherein the cap antenna contact is a cone, a hemisphere, a column, or a domed column.

* * * * *